(12) United States Patent
Matyjaszewski et al.

(10) Patent No.: US 8,865,797 B2
(45) Date of Patent: Oct. 21, 2014

(54) HYBRID PARTICLE COMPOSITE STRUCTURES WITH REDUCED SCATTERING

(75) Inventors: Krzysztof Matyjaszewski, Pittsburgh, PA (US); Lindsay Bombalski, Natrona Heights, PA (US); Michael R. Bockstaller, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1073 days.

(21) Appl. No.: 12/451,575

(22) PCT Filed: May 23, 2008

(86) PCT No.: PCT/US2008/064720
§ 371 (c)(1),
(2), (4) Date: May 4, 2010

(87) PCT Pub. No.: WO2009/023353
PCT Pub. Date: Feb. 19, 2009

(65) Prior Publication Data
US 2010/0249271 A1    Sep. 30, 2010

Related U.S. Application Data

(60) Provisional application No. 60/931,412, filed on May 23, 2007.

(51) Int. Cl.
*C08K 9/00* (2006.01)
*C08F 293/00* (2006.01)
*C08F 292/00* (2006.01)
*C08F 265/04* (2006.01)
*C08F 291/00* (2006.01)
*C08L 51/10* (2006.01)
*C08L 51/00* (2006.01)

(52) U.S. Cl.
CPC ............. *C08F 292/00* (2013.01); *C08F 293/00* (2013.01); *C08F 265/04* (2013.01); *C08F 291/00* (2013.01); *C08L 51/10* (2013.01); *C08L 51/003* (2013.01); *C08F 293/005* (2013.01)
USPC ............................. 523/205; 428/403; 428/407

(58) Field of Classification Search
USPC ................................... 523/205; 428/403, 407
See application file for complete search history.

(56) References Cited

U.S. PATENT DOCUMENTS

| | | |
|---|---|---|
| 3,037,004 A | 5/1962 | Simone et al. |
| 3,096,312 A | 7/1963 | Henry |
| 3,183,217 A | 5/1965 | Serniuk et al. |
| 3,350,374 A | 10/1967 | Fetscher et al. |
| 3,397,186 A | 8/1968 | Edward et al. |
| 3,862,978 A | 1/1975 | Decker et al. |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,486 A | 3/1979 | Haag et al. |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,346,945 A | 9/1994 | Deckers et al. |
| 5,346,954 A * | 9/1994 | Wu et al. .................. 525/85 |

(Continued)

FOREIGN PATENT DOCUMENTS

| | | |
|---|---|---|
| CA | 2209061 | 2/1998 |
| CN | 1165828 A | 11/1997 |

(Continued)

OTHER PUBLICATIONS

Acar, et al., Macromolecules 2000, 33, 7700-7706.

(Continued)

*Primary Examiner* — Hannah Pak
(74) *Attorney, Agent, or Firm* — K&L Gates LLP

(57) ABSTRACT

A core-shell composite particle for incorporation into a composite wherein the composite has improved transparency is disclosed. The core-shell composite particle includes a core material having a first refractive index and a shell material having a second refractive index where the core-shell particle has an effective refractive index determined by the first refractive index and the second refractive index. The effective refractive index is substantially equal to the refractive index of the envisioned embedding medium. Methods of forming the core-shell particles are also disclosed.

24 Claims, 4 Drawing Sheets

(56) References Cited

U.S. PATENT DOCUMENTS

| | | |
|---|---|---|
| 5,401,804 A | 3/1995 | Georges et al. |
| 5,405,913 A | 4/1995 | Harwood et al. |
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,558,954 A | 9/1996 | Morrison |
| 5,610,250 A | 3/1997 | Veregin et al. |
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senniger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,183,866 B1 | 2/2001 | Yamazaki et al. |
| 6,191,197 B1 | 2/2001 | Wang et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,326,455 B2 | 12/2001 | Vassiliou et al. |
| 6,407,187 B1 | 6/2002 | Matyjaszewski et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,598,721 B2 | 7/2003 | Schmidl |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,670,299 B1 | 12/2003 | Marks et al. |
| 6,672,717 B2 | 1/2004 | Smith |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,790,919 B2 | 9/2004 | Matyjaszewski et al. |
| 6,828,025 B2 | 12/2004 | Ali et al. |
| 6,887,962 B2 | 5/2005 | Matyjaszewski et al. |
| 7,018,655 B2 | 3/2006 | Lele et al. |
| 7,019,082 B2 | 3/2006 | Matyjaszewski et al. |
| 7,037,992 B2 | 5/2006 | Wilson et al. |
| 7,049,373 B2 | 5/2006 | Matyjaszewski et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,241,502 B2 | 7/2007 | Anselmann et al. |
| 7,332,550 B2 | 2/2008 | Matyjaszewski et al. |
| 7,572,874 B2 | 8/2009 | Matyjaszewski et al. |
| 7,678,869 B2 | 3/2010 | Matyjaszewski et al. |
| 7,795,355 B2 | 9/2010 | Matyjaszewski et al. |
| 7,825,199 B1 | 11/2010 | Matyjaszewski et al. |
| 2003/0236371 A1 | 12/2003 | Wilson et al. |
| 2004/0044152 A1 | 3/2004 | Matyjaszewski et al. |
| 2004/0152821 A1* | 8/2004 | Saegusa et al. ............... 524/458 |
| 2004/0171779 A1 | 9/2004 | Matyjaszewski et al. |
| 2004/0204556 A1 | 10/2004 | Matyjaszewski et al. |
| 2004/0253443 A1* | 12/2004 | Anselmann et al. .......... 428/403 |
| 2005/0090632 A1 | 4/2005 | Matyjaszewski et al. |
| 2006/0008490 A1 | 1/2006 | Russell et al. |
| 2006/0258826 A1 | 11/2006 | Matyjaszewski et al. |
| 2007/0106012 A1 | 5/2007 | Matyjaszewski et al. |
| 2007/0155926 A1 | 7/2007 | Matyjaszewski et al. |
| 2007/0244265 A1 | 10/2007 | Matyjaszewski et al. |
| 2007/0276101 A1 | 11/2007 | Matyjaszewski et al. |
| 2009/0171024 A1 | 7/2009 | Jakubowski et al. |
| 2009/0312505 A1 | 12/2009 | Matyjaszewski et al. |
| 2010/0143286 A1 | 6/2010 | Matyjaszewski et al. |
| 2011/0060107 A1 | 3/2011 | Matyjaszewski et al. |
| 2011/0218306 A1 | 9/2011 | Matyjaszewski et al. |

FOREIGN PATENT DOCUMENTS

| | | |
|---|---|---|
| EP | 0265091 A1 | 4/1988 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 1386935 A | 2/2004 |
| EP | 1469020 A | 10/2004 |
| EP | 1555273 A1 | 7/2005 |
| JP | 6322171 A | 11/1994 |
| WO | WO 88/00603 A3 | 1/1988 |
| WO | WO 94/13706 A1 | 6/1994 |
| WO | WO 97/18247 A1 | 5/1997 |
| WO | WO 97/47661 A1 | 12/1997 |
| WO | WO 98/01480 A1 | 1/1998 |
| WO | WO 98/06758 A1 | 2/1998 |
| WO | WO 98/20050 A2 | 5/1998 |
| WO | WO 99/28352 A1 | 6/1999 |
| WO | WO 00/47634 A1 | 8/2000 |
| WO | WO 00/56795 A1 | 9/2000 |
| WO | WO 00/75198 A1 | 12/2000 |
| WO | WO 01/77197 A3 | 10/2001 |
| WO | WO 2003/097107 A1 | 11/2003 |
| WO | WO 2004/041972 A1 | 5/2004 |
| WO | WO 2004/060928 A1 | 7/2004 |
| WO | WO 2004/087777 A2 | 10/2004 |
| WO | WO 2005/056621 A1 | 6/2005 |
| WO | WO 2007/025086 A2 | 3/2007 |
| WO | WO 2007/025310 A1 | 3/2007 |
| WO | WO 2007/059350 A2 | 5/2007 |
| WO | WO 2008/009997 A1 | 1/2008 |
| WO | WO 2008/057163 A2 | 5/2008 |
| WO | WO 2008/140282 | 11/2008 |
| WO | WO 2008/148000 A1 | 12/2008 |
| WO | WO 2009/023353 A9 | 2/2009 |
| WO | WO 2009/111725 A1 | 9/2009 |

OTHER PUBLICATIONS

Anderegg, et al., Helv. Chim. Acta 1977, 60, 123.
Annenkov et al., Poly-C-vinyltetrazoles: A New Type of Polyacid,

(56) References Cited

OTHER PUBLICATIONS

Journal of Polymer Science Part A: Polymer Chemistry, 1993, pp. 1903-1906, vol. 31(7).
Ashford, et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.
Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123 (1991).
Baumann, et al., Macromolecular Materials and Engineering (2000), 280/281, 1-6.
Bellus, Pure & Appl. Chem. 57, 1827 (1985).
Bledzki, et al., Makromol. Chem. 184, 745 (1983).
Braunecker, et al., Macromolecules 2005, 38, 4081.
Braunecker, et al., Organometal Chem. 2005, 690, 916.
Brittain et al., Makromol. Chem., Macromol. Symp. 67, pp. 373-386 (1993), "Termination Processes in Group Transfer Polymerization".
Buback, et al. (1995) Macromol. Chem. Phys. 196, 3267-80.
Buback, et al. (2002) Macromol. Chem. Phys. 203, 2570-2582.
Bywater, Makromol. Chem., Macromol. Symp. 67, pp. 339-350 (1993), "Group Transfer Polymerization—A Critical Overview".
Carnahan et al., Synthesis and Characterization of Poly(glycerol-succinic acid) Dendrimers, Macromolecules, 2001, pp. 7648-7655, vol. 34(22).
Carter et al., Polyimide Nanofoams From Phase-Separated Block Copolymers, Electrochemical Society Proceedings, 1997, pp. 32-43, vol. 97(8), Electrochemical Society, Pennington, NJ, US.
Caruso, Nanoengineering of Particle Surfaces—Adv. Mater. 2001, 13, No. 1, Jan. 5, 11-22—Wiley—VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen, et al., Inorg. Chem. 13, 2434 (1974).
Collman et al., "Clicking" Functionality onto Electrode Surfaces, Langmuir, 2004, pp. 1051-1053, vol. 20.
Curran, et al., Comprehensive Organic Synthesis, eds., Pergamon: Oxford vol. 4, p. 715 (1991).
Curran, et al., J. Am. Chem. Soc. 116, 4279 (1994).
Curran, et al., J. Org. Chem., 54, 3140 (1989).
Curran, Synthesis, 489 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries, et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2004, pp. 2113-2116, vol. 41(12).
Desmarquest, et al., Electrochim. Acta (1968), 13, 1109-1113.
Dreezen, et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.
Druliner, Macromolecules, 24, 6079 (1991).
Endo, et al., Macromolecules, 25, 5554 (1992).
Feng, "Synthesis and Free Radical Polymerization of 2-oxo-3-methylene-5-phenyl-1,4-dioxan". Chinese Journal of Polymer Science, 1993, 11, 2, pp. 153-157.
Fischer, et al., Acc. Chem. Res. 20, 200-206 (1987).
Fischer, H., Chem. Rev. 2001, 101, 3581-3610.
Frackowiak, et al., "Supercapacitor electrodes from multiwalled carbon nanotubes", Applied Physics Letters, 77, pp. 2421-2423 (2000).
Fukuda, et al, Chem. Letters, 1996, 4, 293.
Fukuda, et al., Macromolecules, 1996, 29, 3050.
Gabaston, et al., "Synthesis of water soluble homopolymers and block copolymers by living free-radical polymerization", Polymr Preprints (American Chemical Society, Division of Polymer Chemistry), 38(1), pp. 719-720 (1997).
Gaynor, et al., Polym. Prep. (Am. Chem. Soc. Polym. Chem. Div.), 36(1), 467 (1995).
Georges, et al., Macromolecules 1993, 26, 2987.
Georges, et al., Macromolecules 1994, 27, 7228.
Georges, et al., Macromolecules, 1993, 26, 5316.
Gilbert & Williams, Reactivity Ratios of Conjugated Dienes Copolymerized in Emulsion at 5°, J. Am. Chem. Soc. 74, (1952), pp. 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta, et al., Macromolecules, 27, 638 (1994).
Gromada et al., Simultaneous Reverse and Normal Initiation in Atom Transfer Radical Polymerization, Macromolecules, 2001, pp. 7664-7671, 34(22).
Haddleton, et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).
Hawker, "Molecular Weight Control by a Living Free Radical Polymerization Process", Journal American Chem. Society, 1994, vol. 116, pp. 11185-11186.
Hawker, et al., Macromolecules, 1996, 29, 2686.
Hayes, et al., J. Am. Chem. Soc. 110, 5533 (1988).
Hedrick et al., Dendrimer-like Star Block and Amphiphlic Copolymers by Combination of Ring Opening and Atom Transfer Radicat Polymerization. Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao, et al., J. Synth. Org. Chem. (Japan), 52(3), 197 (1994).
Hirao, et al., Syn. Lett. 217 (1990).
Hong, et al., "Synthesis of water-soluble fluorine-containing block copolymers by atom transfer radical polymerization", 25(4), 302 (2001).
Hovestad, et al., Macromolecules 2000, 33, 4048-4052.
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal, et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radi-

(56) References Cited

OTHER PUBLICATIONS cal Polymerizations, American Chemical Society Division of Polymer Chemistry, 2003, Chapter 19, pp. 268-282, vol. 854.
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata, et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato, et al., Macromolecules, 28, 1721 (1995).
Kawaguchi, et al., "Dispersion Polymerization", in Polymer Particles, Masayoshi Okubo, ed., Adv. Polym. Sci., 2005, 175, 299-328.
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kosower, E.M., Acc Chem. Res. (1971), 4, 193-198.
Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Lazzari, et al., Macromolecular Chemistry and Physics (2005), 206, 1382-1388.
Leduc et al., J. Am. Chem. Soc. 1996, 118, 11111-11118.
Lee, et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).
Lewis, et al., Copolymerization VII, Copolymerization of Some Further Monomer Pairs, Apr. 1948, pp. 1527-1529.
Li, et al., "Highly ordered carbon nanotube arrays for electronics applications", Applied Physics Letters, 75 pp. 367-369 (1999).
Li, et al., ASC Polym. Preprints, 1995, 36(1), 469.
Lingane, "Interpretation of the Polarographic Waves of Complex Metal Ions," Chem. Rev. 1941, 29, 1.
Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.
Majoral et al., Dendrimers Containing Heteroatoms (Si, P, B, Ge, or Bi), Chemical Reviews, 1999, pp. 845-880, vol. 99(3).
Makino et al., Controlled Atom Transfer Radical Polymerizations of Methyl Methacrylate Under Micellar Conditions, Polymer Preprints, 1988, pp. 288-289, vol. 39(1).
Mao, et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).
Maraval et al., "Lego" Chemistry for the Straightforward Synthesis of Dendrimer, Journal of Organic Chemistry, 2003, pp. 6043-6046, vol. 68(15).
Mardare, et al., ACS Polymer Preprints 35(1), 778 (1994).
Mardare, et al., Macromolecules, 27, 645 (1994).
Mardare, et al., Polym. Prep. (ACS), 36(1), 700-701 (1995).
Marestin et al., Nitroxide Mediated Living Radical Polymerization of Styrene in Emulsion, Macromolecules, 1998, pp. 4041-4044, vol. 31(12).
Matsumoto, et al., Synth. Commun. (1985) 15, 515.
Matthews et al., Dendrimers-Branching out from Curiosities into New Technologies, Progress in Polymer Science, 1998, pp. 1-56, vol. 23.
Matyjaszewski ed., Controlled/"Living" Radical Polymerization. Progress in ATRP, NMP, and RAFT, in: ACS Symposium Ser., 2000, Chapter 19, Revers e Atom Transfer Radical Polymerization Using AIBN or BPO as Initiator, pp. 263-275.
Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.
Matyjaszewski et al., "Controlled/'Living Radical Polymerization. Kinetics of the Homogeneous Atom Transfer Radical Polymerization of Styrene," J. Am. Chem. Soc., 1997, 119, 674-680.
Matyjaszewski et al., Atom Transfer Radical Polymerization, Chemical Reviews, 2001, pp. 2921-2990, vol. 101(9).
Matyjaszewski et al., Controlled/"Living" Radical Polymerization of Styrene and Methly Methacrylate Catalyzed by Iron Complexes1, Macromolecules, 1997, pp. 8161-8164, vol. 30(26).
Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.
Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.
Matyjaszewski et al., Zerovalent Metals in Controlled/"Living" Radical Polymerization, Macromolecules, 1997, pp. 7348-7350, vol. 30(23).
Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.
Matyjaszewski, "Radical Nature of Cu-Catalyzed Controlled Radical Polymerizations (Atom Transfer Radical Polymerization)," Macromolecules, 1998, 31, 4710-4717.
Matyjaszewski, Controlled Radical Polymerization, American Chemical Society Division of Polymer Chemistry, 1998, ACS Symposium Series, Ch. 1, pp. 2-30. vol. 685.
Matyjaszewski, et al., Macromolecules 34, 5125 (2001).
Matyjaszewski, et al., Tetrahedron (1997), 53, 15321-15329.
McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.
Min, et al, "Atom Transfer Radical Dispersion Polymerization of Styrene in Ethanol", Macromolecules, ACS, Washington, DC, US, vol. 40, No. 20, (Oct. 2, 2007), pp. 7217-7221.
Mitani, et al., J. Am Chem. Soc. 105, 6719 (1983).
Nagashima, J. Org. Chem. 57, 1682 (1992).
Nagashima, J. Org. Chem. 58, 464 (1993).
Navon, et al., Inorg. Chem. 1999, 38, 3484.
Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).
Odell, et al., Macromolecules, 1995, 28, 8453.
Odian, Principles of Polymerization, Third Edition, John Wiley & Sons, p. 205-233 (1991).
Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.
Orochov, et al., J. Chem. Soc., Perkin II, 1000 (1973).
Orr, Thermochemical Aspects of Butadiene-Styrene Copolymerization, 1960, pp. 74-82.
Otsu, et al., Chem. Express 5(10), 801 (1990).
Otsu, et al., Synthesis, Reactivity, and Role of—Vinylbenzyl N,N-Diethyldithiocarbamate as a Monomer-Iniferter in Radical Polymerization, Macromolecules, 1986, pp. 287-290, vol. 19(2).
Pakuka et al., Polymers, Particles, and Surfaces with Hairy Coatings: Synthesis, Structure, Dynamics, and Resulting Properties, in ACS Symposium Series, Advances in Controlled/living Radical Polymer-

(56) References Cited

OTHER PUBLICATIONS izations, American Chemical Society Division of Polymer Chemistry, 2003, Chapter 26, pp. 366-382, vol. 854.
Paoletti, et al., Inorg. Chem. 1967, 6, 64.
Paoletti, et al., Inorg. Chim. Acta Rev. 1973, 7, 43.
Patten et al., Atom Transfer Radical Polymerization and the Synthesis of Polymeric Materials, Advanced Materials, 1998, pp. 901-915, vol. 10(12).
Patten et al., Polymers with very Low Polydispersities from Atom Transfer Radical Polymerization, 1996, Science, pp. 866-868, vol. 272.
Percec et al., "Living" Radical Polymerization of Styrene Initiated by Arenesulfonyl Chlorides and $Cu^1(bpy)_nCl$, Macromolecules, 1995, pp. 7970-7972, vol. 28(23).
Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).
Percec et al., Self-Regulated Phase Transfer of $Cu_2O$/bpy, Cu(0)/bpy, and $Cu_2O$(Cu(0)/bpy Catalyzed "Living" Radical Polymerization Initiated with Sulfonyl Chlorides, Macromolecules, 1998, pp. 4053-4056, vol. 31(12).
Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.
Punna et al., Click Chemistry in Polymer Synthesis, Polymer Preprints, 2004, pp. 778-779, vol. 45(1).
Puts, et al., Macromolecules, 1996, 29, 3323.
Qiu et al., Cyclic Voltammetric Studies of Copper Complexes Catalyzing Atom Transfer Radical Polymerization, Macromolecular Chemistry and Physics, 2000, pp. 1625-1631, vol. 201(14).
Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.
Quirk et al., Makromol. Chem., Macromol. Symp. 67, pp. 351-363 (1993), "Mechanistic Aspects of Group Transfer Polymerization".
Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.
S.A.F. Bon et al., Controlled Radical Polymerization in Emulsion, Macromolecules, 1997, pp. 324-326, vol. 30(2).
Samuni et al., "On the cytotoxicity of vitamin C and metal ions," European Journal of Biochemistry, 1983, 137. 119-124.
Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.
Schulz & Milkovich, Relative Reactivities and Graft Distributions of Polystyrene Macromers in Vinyl Chloride Copolymerization, Polymer International, 1994, pp. 141-149, Great Britain.
Seijas, et al., Tetrahedron, 48(9), 1637 (1992).
Shen, et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.
Srivastava, et al., J. Inorg. Nucl. Chem. (1980), 42, 47.
Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).
Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.

Takeichi et al., Preparation of Porous Carbon Films by the Pyrolysis of Poly(Urethane-imide) Films and Their Pore Characteristics, Carbon, 2001, pp. 257-265, vol. 39(2).
Tang, et al., J. Am. Chem. Soc., 128, 1598-1604 (2006).
Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.
Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).
Udding, et al., J. Org. Chem. 59, 1993 (1994).
Van Gaal et al., "Trends in Redox Potentials of Transition Metal Complexes," Coord. Chem. Rev. 1982, 47, 41.
Veregin, et al., Macromolecules, 1996, 29, 4161.
Vidts, et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).
Vlcek, "Ligand Based Redox Series," Coord. Chem. Rev. 1982, 43, 39.
Von Werne, et at, Preparation of Structurally Well-Defined Polymer—Nanoparticle Hybrids with Controlled/living Radical Polymerizations—J. Am. Chem. Soc. 1999, 121, 7409-7410.
Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.
Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).
Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).
Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.
Wang, et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.
Wang, et al., J. Am. Chem. Soc. (1992), 114, 248-255.
Wang, et al., Polym. Prep. (Am. Chem. Soc. Polym. Chem. Div.), 36(1), 465 (1995).
Wayland, et al., Am. Chem. Soc., 116, 7943 (1994).
Webster, Living Polymerization Methods, Science, 1991, pp. 887-893, vol. 25.
Webster, Makromol. Chem., Macromol. Symp. 67, pp. 365-371 (1993), "Mechanism of GTP: Can all of the Available Data be Accommodated?".
Wei et al., Atom Transfer Radical Polymerization of Styrene in the Presence of Iron Complexes, Polymer Preprints, 1997, pp. 231, vol. 38(2).
Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).
Xia et al., Controlled/"Living" Radical Polymerization. Homogenous Reverse Atom Transfer Radical Polymerization Using AIBN as the Initiator, Macromolecules, 1997, pp. 7692-7696, vol. 30.
Xia, et al., "Atom Transfer Radical Polymerization of 4-Vinylpyridine", Macromolecules, pp. 3531-3533 (1999).
Zeng, et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).
U.S. Appl. No. 09/534,827, filed Mar. 23, 2000.

(56) References Cited

OTHER PUBLICATIONS

Gaynor et al., Macromolecules 1998, 31, 5951-5954.
Chambard et al., Macromol. Symp. 2000, 150, 45-51.
Li et al., Macromolecules 2004, 37, 2106-2112.
Min et al., J. Am. Chem. Soc. 2005, 127, 3825-3830.
Min et al., J. Polym. Sci., Part A: Polym. Chem. 2005, 43, 3616.
Antonietti et al., Macromolecules, 1991, 24: 6636-6643.
Feng et al., Gaofenzi Cailiao Kexue Yu Gongcheng; 2005, 21, 117-120.
Feng, et al., J. Appl. Polym. Sci., 2006, 99 1093.
Min et al., Macromolecules 2005, 38, 8131-8134.
Nicolas et al., Macromolecules 2005, 38, 9963-9973.
Ferguson et al., Macromolecules 2005, 38, 2191-2204.
Gilbert et al., Macromolecular Symposia 2006, 231, 84-93.
Chow et al., Adv. Polym. Sci. 2005, 175, 257-298.
Chow et al., Langmuir 1999, 15, 3202-3205.
El-Safty et al., Chem. Mater. 2005, 17, 3137-3145.
Stoffer et al., J. Polym. Sci. Polym. Chem. Ed. 1980, 18, 2641-2648.
Ferrick et al., Macromolecules 1989, 22, 1515-1517.
Kuo et al., Macromolecules 1987, 20, 1216-1221.
Jakubowski et al., Macromolecules 2005, 38, 4139-4146.
Antonietti et al., Macromol. Chem. Phys. 1995, 196, 441-466.
Guo et al., J. Polym. Sci., Part A: Polym. Chem. 1989, 27, 691-710.
Cramer, W. Proc. Chem. Soc. 1914, 30, 293.
Reiner et al., Baskerville Chemical Journal 1953, 4, 15-17.
Singh et al., Zeitschrift fuer Physikalische Chemie (Leipzig) 1957, 207, 198-204.
Parris et al., Discussions of the Faraday Society 1960, 240-247.
Weiss et al., Inorg. Chem. 1964, 3, 1344-1348.
Maeda et al., J. Adv. Polym. Sci. 2006, 193, 103.
Brown et al., Nature Rev. Cancer 2004, 4, 437.
Khelfallah et al., Macromolecular Rapid Communications 2006, 27, 1004-1008.
Huang et al., Biomarcomolecules 2005, 6, 2131-2139.
Houk et al., J. Am. Chem. Soc. 1987, 109, 6825.
Tsarevsky et al., Thesis CMU, 2005, Chapter 6.
Li et al., Angew Chem. Int. Ed. 2006, 45, 3510.
Li et al., Macromolecules 2006, 39, 2726.
Gao et al., Macromolecules 2005, 38, 5995.
Zelikin et al., Biomacromolecules 2006, 7, 27.
Schafer et al., Free Radical Biol. Med. 2001, 30, 1191.
Medicinal Research Reviews, 2002, 22, 225-250.
Tsarevsky et al., "Combining Atom Transfer Radical Polymerization and Disulfide/Thiol Redox Chemistry: A Route to Well-Defined (Bio)degradable Polymeric Materials", Macromolecules, 2005, 38, 3087-3092.
Oh et al., "Inverse Miniemulsion ATRP: A New Method for Synthesis and Functionalization of Well-Defined Water-Soluble/Cross-Linked Polymeric Particles", Journal of the American Chemical Society, 2006, 128, 5578-5584.
Oh et al., "Biodegradable Nanogels Prepared by Atom Transfer Radical Polymerization as Potential Drug Delivery Carriers: Synthesis, Biodegradation, in Vitro Release, and Bioconjugation", Journal of the American Chemical Society, 2007, 129, 5939-5945.
Barrett, K.E. et al., J. Polym. Sci., Polym. Chem. Ed. 1969, 7, 2621.
Tseng, C.M. et al., J. Polym. Sci., Part A: Polym. Chem. 1986, 24, 2995.
El-Aasser, M.S. et al., J. Polym. Sci., Part A: Polym. Chem. 1996, 34, 2633.
Kawaguchi et al., Adv. Polym. Sci., 2005, 175, 299.
LaMer, V.K. et al., J. Am. Chem. Soc. 1950, 72, 4847.
Yang, W. et al., J. Polym. Sci., Part A: Polym. Chem. 2001, 39, 555.
Song, J. et al., J. Am. Chem. Soc. 2004, 126, 6562.
Song, J. et al., Macromolecules 2005, 38, 8300.
Song, J. et al., 2006, 39, 8318-8325.
Hoelderle, M. et al., Macromolecules 1997, 30, 3420.
Gabaston et al., Macromolecules 1998, 31, 2883.
Shim, S.E. et al., S. Polymer 2003, 44, 5563.
Min, K. et al., "Development of an ab Initio Emulsion Atom Transfer Radical Polymerization: From Microemulsion to Emulson." J. Am. Chem. Soc. 2006, 128(32), 10521-10526.
Min, K. et al., "Atom Transfer Radical Dispersion Polymerization of Styrene in Ethanol" Polymer Preprints, 2007, 48 (2), 260-261.
Pyun et al., "Synthesis of Well-Defined Block Copolymers Tethered to Polysilsequioxane Nanoparticles and their Nanoscale Morphology on Surfaces", J. Am. Chem. Soc. 123, 9445-9446 (2001).
Pyun et al., Supporting Information, J. Am. Chem. Soc., 51-58 (2001).
Tsarevsky et al., Chapter 5: "Factors Determining the Performance of Copper-Based Atom Transfer Radical Polymerization Catalysts and Criteria for Rational Catalyst Section", 56-70 (2006).
Pyun et al., "Synthesis of Nancomposite Organic/Inorganic Hybrid Materials Using Controlled/'Living' Radical Polymerization," Chem. Mater. 13, 3436-3448 (2001).
Pyun et al., "Synthesis of Polymer Brushes Using Atom Transfer Radical Polymerization", Macromol. Rapid Commun. 24, 1043-1059 (2003).
Pyun et al., "Synthesis and Characterization of Organic/Inorganic Hybrid Nanoparticles: Kinetics of Surface-Initiated Atom Transfer Radical Polymerization and Morphology of Hybrid Nanoparticle Ultrathin Films", Macromolecules 36, 5094-5104 (2003).
Matyjasewski et al., Chapter 17 Organic-Inorganic Hybrid Polymers from Atom Transfer Radical Polymerization and Poly(dimethylsiloxane), Am. Chemical Soc. Symposia. 270-283 (2000).
Pyun et al. "Organic/Inorganic Hybrid Materials from Polysiloxanes and Polysilsesquioxanes Using Controlled/Living Radical Polymerization", Manuscript submitted for Publication Jan. 12 (2007).
Bombalski et al., "Quasi-transparent Hybrid Particles Using Atom Transfer Radical Polymerization", Polymeric Materials: Science & Engineering 97, 327 (2007).
Bockstaller et al., "Block Copolymer Nanocomposites: Perspectives for Tailored Functional Materials", Adv. Mater. 17, 1331-1349 (2005).
Bombalski et al., "Null-Scattering Hybrid Particles Using Controlled Radical Polymerization", Adv. Mater. 19, 4486-4490 (2007).
Bouvier-Fontes et al., "Seeded Semicontinuous Emulsion Copolymerization of Butyl Acrylate with Cross-Linkers", Macromolecules 38, 1164-1171 (2005).
Kirsch et al., "Control of Particle Morphology and Film Structures of Carboxylated Poly(Methyl Methacrylate)/Poly(n-Butylacrylate) Composite Latex Particles", Journal of Appliled Polymer Science, vol. 91, 2610-2623 (2004).
Kirsch et al., "Control of Particle Morphology and Film Structures of Carboxylated Poly(N-Butylacrylate)/Poly(methyl) Composite Latex Particles", Colloids and Surfaces, A Physicochemical and Engineering Aspects, 183-185, 725-737 (2001).
Garnett, "Colours in Metal Glasses and in Metallic Films", Phil. Trans. R. Soc. Lond. A. 203, 385-420 (1904).
Garnett, "Colours in Metal Glasses, in Metallic Films, and in Metal Solutions II", Phil. Trans. R. Soc. Lond. A. 205, 237-288 (1906).

* cited by examiner

Fig. 2
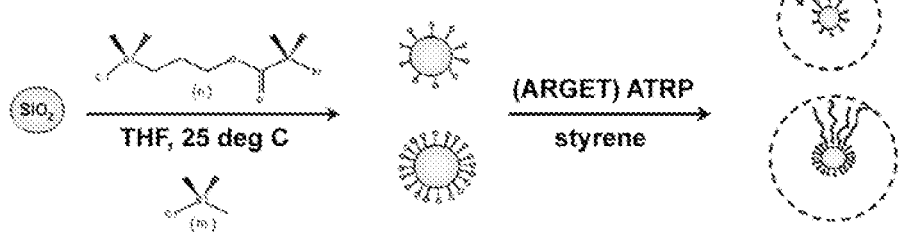
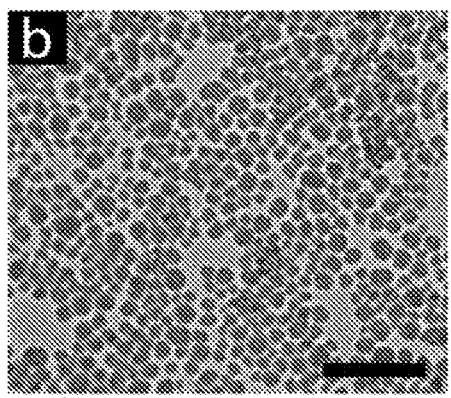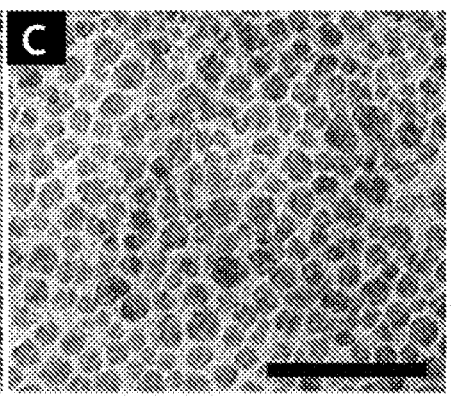
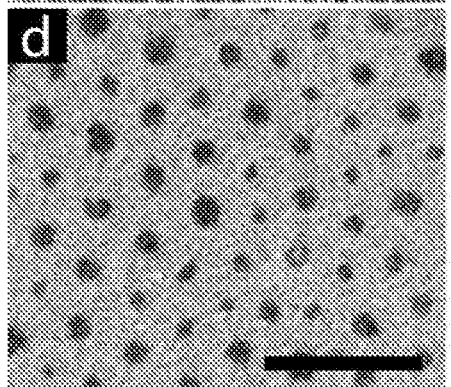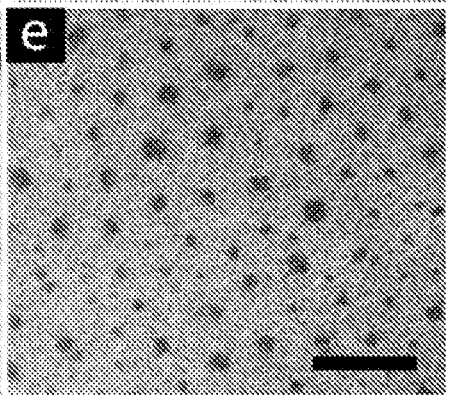
Scale bar is 100 nm.

HYBRID PARTICLE COMPOSITE STRUCTURES WITH REDUCED SCATTERING

CROSS REFERENCE TO RELATED APPLICATIONS

This application is a nationalization of PCT International Application No. PCT/US2008/064720, having an international filing date of May 23, 2008, which claims the priority benefit of U.S. Provisional Application Serial No. 60/931,412 filed May 23, 2007, the disclosures of each of which are incorporated herein by this reference.

Support for the research provided by National Science Foundation Program DMR-0706265 and DMR-0549353.

TECHNICAL FIELD

The present disclosure is directed to the modification of particle surfaces with polymers to generate core-shell particle architectures with an effective refractive index equal to the respective refractive index of the envisioned embedding medium. This allows the physical properties of a composite material to be modified by the added core-shell particles without sacrificing transparency.

BACKGROUND

One of the fundamental problems in polymer composite technology is that the addition of organic or inorganic particles to a transparent polymeric matrix results in a loss of transparency, or generation of opaqueness, due to an increased degree of scattering resulting from the presence of the particle inclusions. In general, the scattering strength (measured in terms of the scattering cross-section) of homogeneous particles of a given size embedded within homogeneous media increases with increasing difference in refractive index between the suspended particle and the embedding medium. In the following discussion we will focus on inorganic particles dispersed in an organic matrix although the parameters can be applied to other mixed media composite structures including organic/inorganic and organic/organic systems.

The particular properties of nano-sized inorganic materials are of central importance to the design of modern composite materials ranging from polymer composites to cosmetic products where particulate additives are added to a matrix material to improve mechanical, thermal, transport, or optical properties. However, in many instances the improvement of one or more specific performance characteristic is compromised by a loss in transparency that results from the scattering of incident electromagnetic radiation, such as, but not limited to, visible light, UV radiation, and IR radiation, by the embedded particle inclusions. This loss of transparency is a consequence of the significantly different refractive index "n" of most inorganic materials and the organic embedding medium. For applications that capitalize on optical transparency, pronounced scattering due to the presence of particulate inclusions presents severe limitations to the maximum concentration of filler particles, as well as the design possibilities, of the organic-matrix composites.

Bohren and Huffman [Bohren, C. F., Huffman, D. R. *Absorption and Scattering of Light by Small Particles*, Wiley, New York, 1983] showed that for optically isotropic particles with linear dimensions significantly less than the wavelength of light, the particle scattering cross-section is given by:

$$C_{sca} \sim V_p^2 (\Delta\alpha)^2 \tag{1}$$

with $V_p$ denoting the particle volume and $\Delta\alpha$ the polarizability difference between the particle and the embedding medium.

The scattering cross-section $C_{sca}$ is a measure of the scattering strength of a particle and is defined in terms of energy conservation: the total energy scattered in all directions is equal to the energy of the incident wave falling on the area $C_{sca}$.

Since $|\Delta\alpha|=|(\in_p-\in_m)/(\in_p+2\in_m)|>>0$ (with $\in_i=n_i^2$ denoting the dielectric constant of medium 'i'; 'p' and 'm' represent the particle and embedding medium, respectively) for most inorganic/organic material combinations, significant scattering can arise even for small particle sizes.

The embodiments of the present disclosure allow the physical properties of a composite material to be modified by the added core-shell particles without sacrificing transparency through modification of particle surfaces with polymers to generate core-shell particle architectures with an effective refractive index and/or effective dielectric constant that is substantially equal to the respective refractive index or dielectric constant of the envisioned or targeted embedding medium.

BRIEF SUMMARY

For core-shell particles, i.e., particles with an architecture that comprises dissimilar constituents in a core and a shell region, the geometry of core and shell is arbitrary. In the case of spherical particles, size is synonymous with diameter while in the case of non-spherical particles size in the following discussion refers to the largest linear dimension of the particle that is below the wavelength of the electromagnetic radiation. The scattering cross-section can be predicted by assuming the scattering arises from a homogeneous 'effective' particle with an 'effective refractive index' that depends on the volume fraction and optical properties of the respective constituents. The effective refractive index of a core-shell particle can be calculated based on the refractive indices and volume fractions of the constituent (core and shell) materials using effective medium theory. Scattering of core-shell particles that are suspended within an embedding medium will be suppressed if the effective refractive index of the core-shell particle is equal or similar to the refractive index of the embedding medium.

According to one embodiment, the present disclosure provides a core-shell composite particle. The composite particle comprises a core material having a first refractive index and a shell material having a second refractive index different from the first refractive index. The core-shell composite particle has an effective refractive index determined by the first refractive index and the second refractive index, wherein the effective refractive index is substantially equal to a refractive index of a target or envisioned embedding medium.

In another embodiment, the present disclosure provides a composite material. The composite material comprises an embedding medium and a core-shell composite particle, as described herein, suspended or embedded in the embedding medium. The composite material according to there embodiments displays at least 70% transmittance of incident electromagnetic radiation.

Still other embodiments of the present disclosure provide a process for forming a core-shell composite particle. The process comprises providing a core material having a surface comprising surface functionality comprising radically transferable atoms or groups and grafting a (co)polymer shell material from at least a portion of the surface of the core material by a controlled radical (co)polymerization process.

According to the process the core-shell composite particle has an effective refractive index determined by a refractive index of the core material and a refractive index of the (co) polymer shell material that is substantially equal to a refractive index of a targeted embedding medium.

BRIEF DESCRIPTION OF THE DRAWINGS

The various embodiments of the present disclosure may be better understood when read in conjunction with the following Figures in which:

FIG. 2A illustrates surface modification of the core material to control shell polymer chain density according to certain embodiments disclosed herein.

FIGS. 2B, 2C, 2D, and 2E illustrate bright-field electron micrographs for core-shell particles of the present disclosure having differing degrees of polymerization in the shell polymer material. FIG. 2B—DP10 (grafting density $\sigma$=0.71 chains/nm$^2$); FIG. 2C—DP140 (grafting density $\sigma$=0.09 chains/nm$^2$); FIG. 2D—DP150 (grafting density $\sigma$=0.5 chains/nm$^2$); FIG. 2E—DP60 (grafting density $\sigma$=0.5 chains/nm$^2$). Scale bar is 100 nm.

FIG. 3A—total scattered intensity R(q) for particle samples DP10 ($\diamond$, c=0.3 mg/mL), DP140 ($\circ$, c=0.3 mg/mL) and DP150 ($\square$, c=0.8 mg/mL) revealing the reduced angular dependence of the scattering intensity for particle samples DP10 and DP140 indicating a decrease in optical phase shift; and FIG. 3B-total scattering intensity R(q) at $q=9.16\times10^6$ m$^{-1}$ as a function of particle composition (m(PS)/m(SiO$_2$)). Arrow in FIG. 3B indicates theoretical null-scattering composition (m(PS)/m(SiO$_2$) ~1.9). FIG. 3B inset plots refractive index increment for particle samples DP10, DP150 and DP760. The reduction of forward scattering of sample DP140 confirms the approximate index-matching condition (i.e. dn/dc=0) is expected for particle compositions m(PS)/m(SiO$_2$)≈0.2, close to the theoretical value.

DETAILED DESCRIPTION

Figure 1:
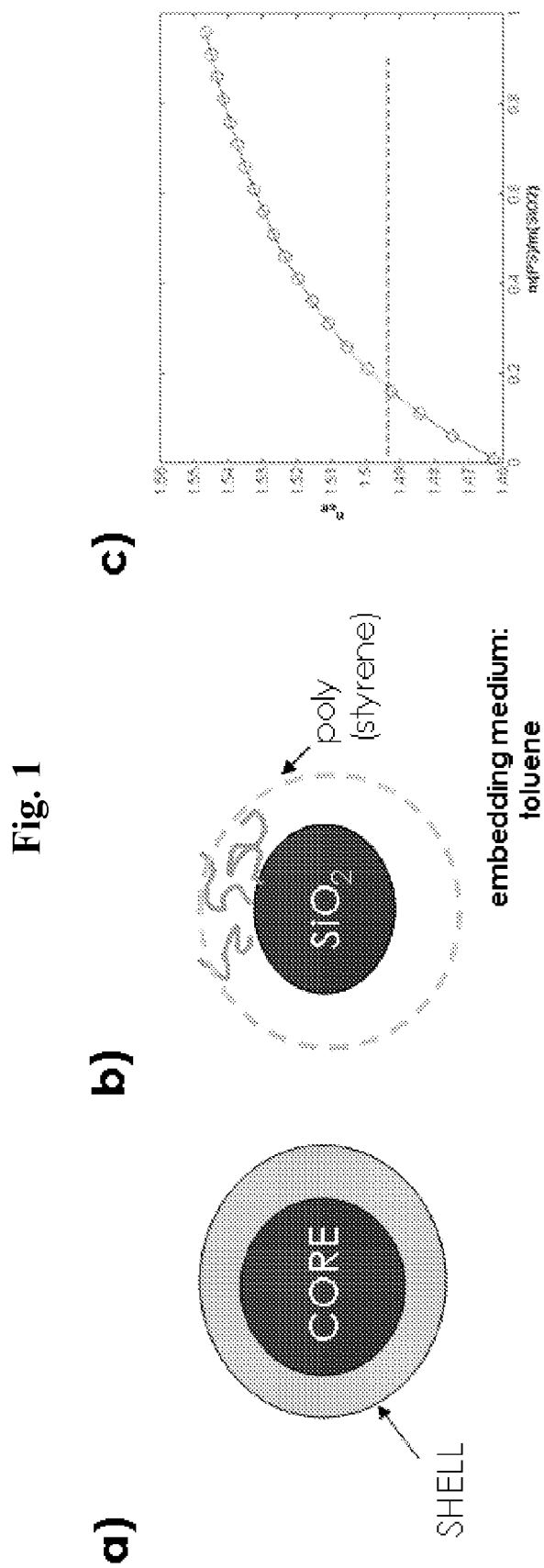
FIG. 1A illustrates a core-shell particle with distinct homogeneous material components comprising the particle core and shell region.
FIG. 1B illustrates one exemplary embodiment of the present disclosure comprising an experimental system comprising a silica nanocrystal (average core diameter approximately 20 nm) and a shell comprising polystyrene (PS) shell material (thickness variable).
FIG. 1C illustrates calculation of the effective refractive index of a silica-polystyrene core-shell particle as a function of composition according to one embodiment of the present disclosure. The dotted line represents the refractive index of toluene. The mass ratio m(PS)/m(silica) ~0.2 corresponds to a non-scattering configuration.

The present disclosure is directed toward the novel core-shell composite particles which when embedded or suspended is a specific embedding medium display reduced scattering of incident electromagnetic radiation. The scattering cross-section of a matrix formed by suspension/embedding the core-shell composite particle in the embedding medium may be predicted by assuming the scattering arises from a homogeneous "effective" particle with an "effective refractive index" that depends on the volume fraction and the optical properties of the respective constituents (i.e., the core material and the shell material).

The effective refractive index of a core-shell composite particle, as described herein, can be calculated based on the refractive indices and volume fractions of the constituents (i.e., the core material and the shell material) using effective medium theory. Scattering of core-shell particles that are suspended within a targeted or envisioned embedding medium will be suppressed if the effective refractive index of the core-shell composite particle is substantially equal or similar to the refractive index of the targeted or envisioned embedding medium.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

The present disclosure describes several different features and aspects of the various exemplary embodiments provided herein. It is understood, however, that the present disclosure embraces numerous alternative embodiments, which may be accomplished by combining any of the different features, aspects, and embodiments described herein in any combination that one of ordinary skill in the art would find useful.

In one embodiment of the present disclosure, it is demonstrated the scattering of incident electromagnetic radiation by inorganic particles can be efficiently suppressed by grafting of polymers of appropriate composition, molecular weight and grafting density from or to the particles' surface to match the effective refractive index and/or dielectric constant of the resulting core-shell particle to the refractive index and/or dielectric constant of the embedding medium. Key to the disclosed approach is the previously undisclosed recognition that for core-shell particles, with a size less than the wavelength of light, the optical properties are equal to those of a homogeneous particle, with an effective dielectric constant that depends on the optical properties and volume fractions of the respective constituents. As used herein, the term "incident electromagnetic radiation" includes, but is not limited to, infrared, visible, and ultraviolet radiation directed through a matrix formed from the core-shell composite particle suspended in the target or envisioned embedding medium. As used herein, the terms "targeted embedding medium" and "envisioned embedding medium" are used synonymously and include the medium into which the particles of the present disclosure are intended to be embedded or suspended within. Examples of embedding media include, liquids, including highly viscous liquids, solids, and gasses, such as, but not limited to, solvents, oils, gels, oligomers, polymeric materials, copolymeric materials, coatings, silica, transparent metal oxides, and inorganic glasses.

With reference to the particle size/electromagnetic radiation wavelength relationship, at wavelengths larger than the core-shell particle dimensions, the particles' effective dielectric constant is given by Maxwell-Garnett theory [see, J. C. Maxwell-Garnett *Phil. Trans. Roy. Soc.* (*London*) A, 1904, 203, 385; and 1906, 205, 237], equation 2.

$$\varepsilon_{eff} = \varepsilon_{shell}\left(1 + 3\frac{\phi x}{1 - \phi x}\right) \qquad (2)$$

Here, $x = \frac{1}{3}(\varepsilon_{core} - \varepsilon_{shell})/(\varepsilon_{core} - \frac{1}{3}(\varepsilon_{core} - \varepsilon_{shell}))$, $\varepsilon_{core}$ and $\varepsilon_{shell}$ represent the dielectric constant of the particle-core and shell, respectively, and $\phi = V_{core}/(V_{core} + V_{shell})$ is the relative particle-core volume. Several effective medium models (such as Maxwell-Garnett, Bruggeman, Bergman, etc.) have been postulated that differ by the underlying assumptions about the systems' morphology, as well as the approximation used to capture interactions between the inclusions. In the case of discrete particle inclusions in a homogeneous medium, the Maxwell-Garnett theory is generally considered to be most appropriate. The relationship between the dielectric constant and the refractive index for specific compositions is well understood. The dielectric constant (which is dependent on wavelength) is the square of the refractive index. Refractive index is commonly used in optical applications, whereas dielectric constant is used in electronics.

In the quasi-static limit (i.e., for particle diameters or size much smaller than the wavelength of light), Maxwell-Garnett theory presents an analytically accurate solution to the effective dielectric constant of a core-shell particle. The effective refractive index is calculated from the refractive indices of the core material and the shell material, assuming that the solvent does not interpenetrate the polymer brush grafted to the particle surface, i.e., the polymer is in the dry-brush regime (approximately valid in the limit of high grafting densities).

Equation 2 therefore provides design criteria for the synthesis of quasi-transparent particle additives, i.e., by grafting a shell with a dielectric constant greater than (less than) the dielectric constant of the embedding media to a particle core material that has a dielectric constant less than (greater than) the embedding media, such that $\varepsilon_{eff} \approx \varepsilon_m$.

The "effective index-matching" method to suppress scattering contributions is particularly attractive if the shell is comprised by a polymer grafted to the particle surface. In the case of an organic particle an additional requirement is that the core and the shell comprise incompatible segments. This is because polymer-grafting techniques may be used in order to facilitate the dispersion, or thermodynamic stabilization of the dispersion, of particle additives in organic matrices and thus no additional synthetic processing steps—other than (1) control of the grafting density, (2) molecular weight of the surface-bound polymer and (3) appropriate selection of the composition of the tethered (co)polymer—are necessary in order to minimize scattering according to the presently disclosed method. The present disclosure describes modification of particle surfaces (i.e., the surface of the core material) with suitable polymers or other organic/inorganic coatings and is exemplified by using controlled polymerization procedures in order to generate core-shell particle architectures with an effective refractive index equal to the respective embedding medium with the aim of suppressing the particle scattering. Examples of suitable controlled polymerization procedures include living/controlled ionic polymerization procedures (i.e., controlled anionic polymerizations and controlled cationic polymerization procedures) and in particularly preferred embodiments, living/controlled radical polymerization procedures (CRP).

A controlled "grafting from" polymerization process is preferred since one of the advantages of a controlled polymerization process is the ability to grow a polymer chain with a desired molecular weight (MW), or desired degree of polymerization (DP), that when taken into consideration with the number of initiating sites provides a means to control the volume fraction of the tethered shell (co)polymer. In this manner, it is possible to control the thickness and density of the shell attached to the particle and hence the effective refractive index of the core-shell composite particle. For certain monomers, a living/controlled ionic polymerization process would be preferred and those skilled in the art of anionic or cationic polymerization can apply these techniques to the disclosed procedure. However, for the majority of tethered shell (co)polymers, a controlled radical polymerization (CRP) processes is a preferred polymerization process, since a radical polymerization process can (co)polymerize a broad range of commercially available monomers providing well defined shell structures comprising a spectrum of refractive indices, thereby allowing control over both the refractive index of the shell material of a composite particle (and therefore, the effective refractive index of the core-shell composite particle) and the solubility of the shell (and therefore, the solubility of the core-shell composite particle) in the targeted matrix material.

Indeed, according to one embodiment by employing a CRP for the grafting from synthesis of the shell material from the surface of the core material, one can prepare a tethered block copolymer wherein the second outer layer of the shell material is selected to be the same composition as the target matrix embedding material, or soluble in the selected target matrices, to ensure dispersion of the particle in the matrix/embedding material and sufficient chain entanglement between the outer shell chains and matrix chains to provide good transfer of stress to the dispersed particles. A tapered or gradient copolymer can also be prepared by a CRP wherein the comonomer with greater phylicity for the target matrix is increasingly incorporated into the periphery of the shell. The required physical properties of the particle reinforced structure will provide one skilled in the art with definitions for the words "sufficient" and "good" in the previous sentence, but one definition would be that the final properties of the composite structure are equal or better than an equivalent composite where retention of optical properties were ignored. Examples of suitable CRP procedures include, for example, but not limited to, atom transfer radical polymerization (ATRP), reverse ATRP, simultaneous reverse and normal initiation ATRP (SR&NI ATRP), initiator for continuous activator regeneration ATRP (ICAR ATRP), activators regenerated by electron transfer ATRP (ARGET ATRP), nitroxide mediated polymerization (NMP), reversible addition fragmentation termination (RAFT) and others including degenerative transfer and cobalt mediated transfer. However as noted above it is the final result that is of importance: control over grafting density, molecular weight and composition of the tethered copolymer and non-controlled but consistent polymerization procedures can result in "control" over these parameters.

ATRP has been described in a number of patents and patent applications with Matyjaszewski as co-inventor that are assigned to Carnegie Mellon University, including: U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314;

6,790,919; 6,759,491; 6,887,962; 7,019,082; 7,056,455; 7,064,166; 7,125,938; 7,157,530; and 7,332,550 and U.S. and International PCT patent application Ser. Nos. 09/534,827; 09/972,056; 10/034,908; 10/269,556; 10/289,545; 10/638,584; 10/860,807; 10/684,137; 10/781,061; 10/992,249 11/059,217; 10/887,029; 11/430,216; 10/548,354; 11/593,185; PCT/US05/07264, PCT/US05/07265, and PCT/US06/33792, all of which are herein incorporated by reference, for example, to define which monomers can be (co)polymerized in an ATRP process and which ligands should be selected to provide stable active transition metal complexes in various media. ATRP has also been discussed in numerous publications and reviewed in several book chapters [see, *ACS Symp. Ser.*, 1998, 685; *ACS Symp. Ser.*, 2000; 768; *Chem. Rev.* 2001, 101, 2921-2990; *ACS Symp. Ser.*, 2003; 854; *ACS Symp. Ser.*, 2006; 944], the disclosures of which are incorporated in their entirety by reference herein. Within these published articles and book chapters similar polymerization systems employing of forming the four essential components required for an ATRP may be referred to by different names, such as transition metal mediated polymerization or atom transfer polymerization, but the processes are similar and referred to herein as "ATRP".

The use of ATRP to form the shell material of the particle with low levels of catalyst as detailed in co-assigned U.S. Provisional Application Ser. No. 61/008,426, hereby incorporated by reference in its entirety, also allows one to tailor the polydispersity of the (co)polymer comprising the shell material and hence the density of the tethered polymer chains at the periphery of the shell.

According to certain embodiments, a "grafting to" process can also be applied to the formation of the core-shell structure employing inherent functionality on the core structure to terminate an active polymerization or to react with the appropriate terminal functionality on a preformed polymer.

According to other embodiments, sol-gel chemistry (e.g. hydrolysis of alkoxy-silanes) can also be applied to generate inorganic core-shell structures in which the scattering is suppressed by appropriate combination of core and shell constituents.

According to still other embodiments, selective adhesion of block copolymer additives can also be used to generate core-shell structures, these might be particularly interesting for soft particle inclusions (such as rubber inclusions in glassy polymer matrices).

For core-shell composite particles as described herein, i.e., particles with an architecture that comprises dissimilar constituents in a core and a shell region with a size that is below the wavelength of the incident electromagnetic radiation, the scattering cross-section can be predicted by assuming the scattering to arise from a homogeneous "effective" particle with an "effective refractive index" that depends at least in part on the volume fraction and optical properties of the respective constituents. The effective refractive index of a core-shell composite particle can be calculated based on the refractive indices and volume fractions of the constituent (core and shell) materials using effective medium theory. Scattering of core-shell particles that are suspended within a targeted embedding medium will be suppressed if the effective refractive index of the core-shell particle is equal or similar to the refractive index of the embedding medium.

In one exemplification of the invention, a method is described to reduce the scattering cross-section of typical inorganic filler particles in an organic suspending media by grafting polymers of appropriate composition from the particle surface by means of controlled radical polymerization. The aim of this aspect of the invention is the fabrication of transparent polymer nano-composites and particle suspensions that combine a particular property of the dispersed nano-scale material (i.e., the core-shell composite particle, such as UV-absorption, modulus (either high or low), impermeability, or another desired property) without increasing the opaqueness of the composite material compared to the pure embedding medium. This method is applicable to filler particles made from metals and metal-oxides, as well as dielectric materials such as silica or titania, with a typical size ranging from 2 nm to 500 nm and facilitates concurrent homogenization with polymer matrices or liquid and gel-based suspending media.

Certain particulate materials and metals scatter light over a broader spectrum and in such a case the shell of the particle must be designed to provide the opposite dispersing characteristics. This can be accomplished by incorporation of a spectrum of functional comonomers into the tethered shell to provide a broad range of adsorption.

In another aspect of the present disclosure, the particle can be an organic particle comprising a material displaying a low modulus core that is added to a solid matrix material to improve the toughness of the composite without sacrificing clarity.

In one exemplification of the present disclosure, typical core materials will comprise metals, metal oxides or dielectric materials. The technique is applicable to particles of arbitrary shape with linear dimensions smaller than the wavelength of light.

The choice of polymer to comprise the shell material will depend on the refractive index of the core material and suspending/embedding material. According to these embodiments, two principal scenarios may be possible:
  a) The refractive index of the core material is greater than the refractive index of the suspending/embedding medium: in which case, the shell polymer material should be designed with a refractive index lower than refractive index of suspending/embedding medium.
  b) The refractive index of the core material is less than the refractive index of the suspending medium: in which case, the shell polymer material should be designed with a refractive index greater than refractive index of suspending medium.

For the purpose of establishing the viability of the methods and compositions of the present disclosure, the technique was initially demonstrated for the particular case of silica nano-particles as the core material (refractive index 1.46) in the liquid suspending medium toluene (refractive index 1.50). The core material particles are surface functionalized with a polystyrene shell material (refractive index 1.59) that is grafted from the particle surface by means of a controlled radical polymerization technique, i.e., Atom Transfer Radical Polymerization (ATRP). ATRP is one of a number of suitable controlled radical polymerization processes, including nitroxide mediated polymerization (NMP) and reversible addition fragmentation termination (RAFT) and others including degenerative transfer and cobalt mediated transfer. The reverse procedure, whereby a preformed functional polymer is grafted to the particle surface, can also be applied.

While the presented method focuses on the use of controlled radical polymerization techniques to suppress the scattering of visible light of particle inclusions in polymer matrices, the principal features of the approach are of general validity and pertain to a wide variety to particle-systems including: a) the use of shell materials such as organic and inorganic polymers as well as dielectric materials, metals or metal oxides; and b) gaseous, liquid and solid embedding media particles of any size as long as the maximum feature size is less than the wavelength of the radiation of which scattering is to be suppressed.

The use of controlled radical polymerization to functionalize nano-particle additives in order to tailor the effective refractive index of a core-shell particle to be substantially equal to the refractive index of the embedding medium is novel.

The controlled synthesis of a shell material comprising a controlled composition on a nano-particle core additive (or otherwise fabricated particle core-shell structures) with the purpose of tailoring the effective refractive index of the resulting core-shell particle to be equal to the refractive index of the embedding medium is novel.

The conceptual approach to use effective medium theory in order to predict the adequate shell material composition and overall core-shell particle composition, as well as particle shell dimensions, such as to suppress or reduce scattering of incident electromagnetic radiation by the resulting matrix comprising the core-shell composite particle and the medium is new.

In particular, the presented technique facilitates a solution to a prominent problem in nano-composite science, i.e., the scattering of incident electromagnetic radiation by embedded particle additives thus degrading the optical properties and design opportunities of filled materials. The method facilitates the suppression of scattering contributions of embedded particles and thus facilitates the fabrication of transparent (optically clear) or near transparent composite materials. This gives rise to entirely new design opportunities for product development.

The application of the present disclosure is replacement of conventional particle fillers in all areas in which particle additives are added to a specific embedding media in order to enhance some of the properties (optical, mechanical, thermal, transport) of the embedding media and in which the embedded particles give rise to opaqueness that is unfavorable to the performance of the final product or that limits the possibilities of product design. Applications encompass, but are not limited to polymer nano-composites, paints, cosmetic pastes, food products, glass coloration, lasing materials, radiation shielding applications, etc.

According to one embodiment, the present disclosure provides for a core-shell composite particle comprising a core material having a first refractive index and a shell material having a second refractive index different from the first refractive index. The core-shell composite particle may have an effective refractive index, as described herein that is determined by the first refractive index and the second refractive index. The effective refractive index of the core-shell composite particle is substantially equal to the refractive index of the targeted embedding medium. As used herein, the term "substantially equal" when used with referenced to the values of the refractive indices of the components of the present disclosure means that the refractive indices in question have a difference of less than 5% from each other. According to these embodiments, the scattering cross-section of the particle can be predicted by assuming that the scattering arises from a homogeneous "effective" particle comprising the core material and the shell material with an "effective refractive index" that is determined at least in part, by the volume fraction and the optical properties of the respective constituents. For example, for a core material of a specific refractive index (determined by volume fraction and optical properties of the core material), a shell material may be designed and synthesized such that the refractive index of the shell material results in a combined "effective refractive index" that results in suppression of scattering of incident electromagnetic radiation.

According to certain embodiments, the core material may be a material selected from an inorganic material and an organic material. For example, in certain embodiments, the core material may be an inorganic material, such as a metal, a metal oxide, or a dielectric material, including, but not limited to silica, titania materials, zinc oxide, alumina or zirconia. In other embodiments, compositions provided herein include a core material which includes at least one metal or metal oxide selected from among scandium, titanium, vanadium, chromium, manganese, iron, cobalt, nickel, copper, zinc, yttrium, zirconium, niobium, molybdenum, ruthenium, rhodium, palladium, silver, cadmium, hafnium, tantalum, tungsten, rhenium, osmium, iridium, platinum, gold, gadolinium, aluminum, gallium, indium, tin, thallium, lead, bismuth, magnesium, calcium, strontium, barium, lithium, sodium, potassium, boron, silicon, phosphorus, germanium, arsenic, antimony, and combinations thereof.

In some other embodiments, compositions provided herein include a core material that includes at least one metal selected from among titanium, vanadium, chromium, manganese, iron, cobalt, nickel, copper, zinc, zirconium, molybdenum, ruthenium, rhodium, palladium, silver, cadmium, tungsten, rhenium, osmium, iridium, platinum, gold, aluminum, bismuth, and combinations thereof. In certain embodiments, compositions provided herein include a core material that includes a metal selected from among iron and gold.

In other embodiments the core material can be considered to display opto-electronic properties such luminescent semiconductor nanocrystals, quantum dots or structured II-VI-semiconductor nanoparticles. Such nano-particles include one or more inorganic materials from the group consisting of: titania ($TiO_2$), nanocrystalline $TiO_2$, zinc oxide (ZnO), copper oxide (CuO or $Cu_2O$ or $Cu_xO_y$), zirconium oxide, lanthanum oxide, niobium oxide, tin oxide, indium oxide, indium tin oxide (InSnO), vanadium oxide, molybdenum oxide, tungsten oxide, strontium oxide, calcium/titanium oxide and other oxides, sodium titanate, potassium niobate, cadmium selenide (CdSe), cadmium sulfide (CdS), copper sulfide ($Cu_2S$), cadmium telluride (CdTe), cadmium-tellurium selenide (CdTeSe), copper-indium selenide ($CuInSe_2$), cadmium oxide ($CdO_x$), CuI, CuSCN, a semiconductive material, or combinations of the above. Semiconductor nanocrystals may be included, e.g., a core of the binary formula MX, where M can be cadmium, zinc, mercury, aluminum, iron, lead, tin, gallium, indium, thallium, magnesium, calcium, strontium, barium, copper, and mixtures or alloys thereof and X is sulfur, selenium, tellurium, nitrogen, phosphorus, arsenic, antimony or mixtures thereof; a core of the ternary formula $M^1M^2X$, where $M^1$ and $M^2$ can be cadmium, zinc, mercury, aluminum, iron, lead, tin, gallium, indium, thallium, magnesium, calcium, strontium, barium, copper, and mixtures or alloys thereof and X is as defined above; a core of the quaternary formula $M^1M^2M^3X$, where $M^1$, $M^2$ and $M^3$ can be cadmium, zinc, mercury, aluminum, iron, lead, tin, gallium, indium, thallium, magnesium, calcium, strontium, barium, copper, and mixtures or alloys thereof and X is as defined above. Specific examples of suitable non-oxide semiconductor nanocrystal materials can include cadmium selenide (CdSe), cadmium telluride (CdTe), zinc telluride (ZnTe), iron sulfide (FeS), gallium phosphide (GaP), indium phosphide (InP), indium antimonide (InSb) and the like, mixtures of such materials, or any other semiconductor or similar materials. Other useful semiconductor materials may be of silicon carbide (SiC), silver indium sulfide ($AgInS_2$), silver gallium selenide ($AgGaSe_2$), copper gallium selenide ($CuGaSe_2$), copper indium selenide (CuInSe$_2$), magnesium silicon phosphide (MgSiP$_2$), zinc silicon phosphide (ZnSiP$_2$), zinc germanium phosphide (ZnGeP$_2$) and the like. Still other useful semiconductor materials may be of silicon, germanium, or alpha-tin In other embodiments, the core material may be an organic material, such as an organic polymer or copolymer material, including a liquid or a gas. In specific embodiments, the organic polymeric core material may have a glass transition temperature less than room temperature. In still other embodiments, the core material and the shell material may comprise incompatible segments.

For certain embodiments of the core material or the shell material, for example, those embodiments where at least one of the core material or the shell material comprise an organic (co)polymer material, the core material or the shell material may comprise crosslinked (co)polymer segments. For example, during a CRP process for forming either the core material or shell material, a crosslinkable monomer may be added to the reaction mixture.

In certain embodiments, the shell material may be a material selected from an inorganic material and an organic material. In specific embodiments, the shell material may be an organic polymer or copolymer material, such as a material formed by a living/controlled polymerization process. Suitable controlled polymerization processes are described in detail herein and may include controlled ionic polymerizations and controlled radical polymerization processes. For example, in certain embodiments, the shell material may be an organic (co)polymeric material formed by a controlled radical (co)polymerization process wherein the shell material is grafted from at least a portion of a surface of the core material. According to certain embodiments, the core material may originally comprise surface terminal functionality comprising radically transferable atoms or groups, such that an ATRP type grafting from process may be utilized to form the shell material of the core-shell composite particle.

According to certain embodiments of the present disclosure, the first refractive index may be greater than the second refractive index. According to these embodiments, the effective refractive index of the particle will have a value less than the first refractive index but greater than the second refractive index. In other embodiments, the first refractive index may be less than the second refractive index. According to these embodiments, the effective refractive index of the particle will have a value greater than the first refractive index but less than the second refractive index. By tailoring the shell material by control of the polymerization process, the refractive index of the shell material may be selected such that the effective refractive index of the core-shell particle is substantially equal to the refractive index of the targeted embedding medium.

According to specific embodiments, the effective refractive index of the particle is substantially equal to the refractive index of the embedding medium. For example, in one embodiment, the effective refractive index of the particle has a difference from the refractive index of the embedding medium of ±0.1. In other embodiments, the effective refractive index of the particle has a difference from the refractive index of the embedding medium of ±0.05. In still other embodiments, the effective refractive index of the particle has a difference from the refractive index of the embedding medium of ±0.03. In other embodiments, the effective refractive index is within 5% of the refractive index of the envisioned medium.

As discussed herein, for the core-shell composite particles of the present disclosure to display the homogeneity when treated with incident electromagnetic radiation, such that certain optical and/or electrical properties, including refractive index and dielectric constant, of the core-shell may be determined as set forth herein, the particle size must be on the nanoscale. In specific embodiments, the core-shell composite particle may have a particle size less than the wavelength of the specific incident electromagnetic radiation. Thus, the size of the core material must be sufficiently small such that, upon grafting the shell material from the core material surface, the resulting core-shell composite particle may have the necessary particle size (i.e., less than the incident electromagnetic radiation). In certain embodiments, the core material may have a core size ranging from 2 nm to 500 mm. In other embodiments, the core material may have a core size ranging from 5 nm to 100 nm. In other embodiments, the core material can be substantially larger according to the wavelength for which the scattering is to be reduced.

In certain embodiments of the present disclosure, the first refractive index may have an equal or opposite sign of the refractive index dispersion compared to the sign of the second refractive index. Refractive index dispersion denotes the wavelength dependence of a materials' refractive index. The combination of core-shell materials with opposite sign of refractive index dispersion is a relevant extension of the concepts disclosed herein, as it facilitates the reduction of scattering of materials (such as metals, or semiconductors) with significant dispersion of refractive index over a wide range of wavelengths. According to these embodiments, two realizations are possible: a) if the core materials exhibit substantial refractive index dispersion then the choice of shell materials can be such that the dispersion of refractive index over the wavelength range of interest will mutually cancel each other thus resulting in a substantially constant refractive index; or b) if the embedding medium consists of a material with significant refractive index dispersion then either the core material, the shell material or both can be chosen such that the effective refractive index dispersion of the core-shell particle equals the refractive index dispersion of the embedding medium.

According to certain embodiments, the graft density of the polymer chains of the shell material may be manipulated, for example to control the interactions with the molecules or polymer chains of the embedding medium. For example, in certain embodiments the surface of the core material may comprise specific surface functionality, such as the presence of a certain concentration of an initiator functionality, for example, a radically transferable atom or group suitable for use in an ATRP-type process. In these embodiments, at least a portion of an outer surface of the core material may be functionalized by reacting the portion of the surface with a reactive mixture of reactants having an initiator functionality and reactants having no initiator functionality. In these embodiments, the grafting density of the initiator functionality on the functionalized portion of the surface of the core material, for example the radically transferable atoms or groups, may be controlled by the ratio and/or reactivity of the reactants having the initiator functionality and the reactants having no initiator functionality.

This concept is exemplified in FIG. 2A were the surface of a silica particle is functionalized by modification with a blend of initiator (1-chlorodimethylsilylpropyl 2-bromoisobutyrate) and a "dummy" ligand (chlorotrimethyl-1-silane—a reactant having no initiator functionality). The relative reactivity and control of the reactant ratio allows control of the density of the radically transferable atoms or groups on the portion of the surface of the core material. Subsequent ATRP polymerization grafting from or to the core material surface results in a core-shell composite particle with a specific graft density for the shell material. In specific embodiments, the shell material may have a graft density sufficiently high to prevent solvent/matrix interpenetration of the shell material. In other embodiments, the shell material may have a graft density sufficiently low to allow solvent/matrix interpenetration of the shell material. Interpenetration of the solvent or matrix/medium into the shell material may have effects on the properties of the particle/medium matrix, such as solubility of the particles in the medium, suspension properties of the particles in the medium, and/or particle packing in the medium.

According to the various embodiments disclosed herein, upon suspension of the core-shell particle in the selected embedding medium to form a suspended matrix comprising the particle within the medium wherein the effective refractive index of the particle is substantially equal to the refractive index of the medium, the matrix displays a reduced scattering cross-section of incident electromagnetic radiation compared to a matrix where the effective refractive index of the core-shell composite particle is not substantially equal to the refractive index of the embedding medium. Thus, in specific embodiments, the matrix comprising the core-shell particle suspended within the medium will be substantially transparent (i.e., show reduced scattering of incident electromagnetic radiation in the visible, infrared, UV spectrum, and/or other portion of the electromagnetic spectrum). One non-limiting method for measuring transparency is by percent transmittance of the incident electromagnetic radiation through the matrix. According to one embodiment, the matrix may display at least 70% transmittance of the incident electromagnetic radiation. In another embodiment, the matrix may display at least 80% transmittance of the incident electromagnetic radiation. In still another embodiment, the matrix may display at least 90% transmittance of the incident electromagnetic radiation. In still another embodiment, the matrix may display at least 95% transmittance of the incident electromagnetic radiation. The present disclosure should not be considered limited by any specific method of measuring transparency of the matrix.

It should be noted that the conceptual framework of the present disclosure may also be utilized to form core-shell particle/medium matrices that are not transparent and have specific defined opacities. For example, the core-shell particle effective refractive index may be engineered to have any particular value relative to the refractive index of the envisioned embedding medium. While the various embodiments disclosed herein address systems where the effective refractive index is substantially equal to the refractive index of the embedding medium, other embodiments may be envisioned where the effective refractive index is tailored or engineered to be different from the refractive index of the embedding medium. For example, certain optical effects, such as, but not limited to, opalescence, may be possible with appropriately selected differences in refractive indices. These applications are to be considered within the scope of the present disclosure.

In still other embodiments, the present disclosure provides for a composite material comprising a selected embedding medium and a core-shell composite particle as described herein which is suspended or embedded in the embedding medium. According to these embodiments the composite material may display at least 70% transmittance of incident electromagnetic radiation. In other embodiments, the composite material may display at least 80%, at least 90% or even at least 95% transmittance of incident electromagnetic radiation.

Still further embodiments of the present disclosure provide for processes for forming a core-shell composite particle as described herein. According to certain embodiments, the process may comprise providing a core material having a surface comprising surface functionality comprising radically transferable atoms or groups and grafting a (co)polymer shell material from at least a portion of the surface of the core material by a controlled. (co)polymerization process, such as, a living/controlled ionic (co)polymerization process or a living/controlled radical (co)polymerization process. According to various embodiments, the core-shell composite particle may have an effective refractive index determined by a refractive index of the core material and a refractive index of the (co)polymer shell material that is substantially equal to a refractive index of a targeted embedding medium. In specific embodiments, the core material and the shell material may comprise different constituents having equal or opposite sign of the refractive index dispersion.

In specific embodiments, providing a core material having a surface comprising surface functionality may comprise functionalizing at least a portion of a surface of the core material with a reactive mixture of reactants having an initiator functionality and reactants having no initiator functionality. According to specific embodiments, the initiator functionality may comprise a radically transferable atom or group that may participate in an ATRP (as set forth in greater detail herein) or other controlled polymerization process. In particular embodiments, the grafting density of the radically transferable atoms or groups on the at least a portion of the surface of the core material may be controlled by at least one of the relative reactivity or ratio of the reactants having the initiator functionality and the reactants having no initiator functionality.

The various non-limiting embodiments of the present two-step atom transfer dispersion polymerization process described herein will be better understood when read in conjunction with the following non-limiting examples.

EXAMPLES

The system initially selected to exemplify the concept consists of polystyrene (PS) functionalized silica nanoparticles (PS@SiO$_2$; average particle-core diameter $\langle d \rangle$ =20 nm) solubilized in toluene. The choice of a liquid embedding medium is motivated solely by experimental convenience, i.e., the straightforward experimental verification of the dispersion state of the particle inclusions by dynamic light scattering, however, analogous conclusions pertain to solid embedding media such as polymers or viscous imbedding media such as gels. FIG. 1C illustrates the property characteristics of the PS@SiO$_2$/toluene system as well as the dependence of the particles' effective refractive index on the core-shell composition. For particles with mass composition of m(PS)/m(SiO$_2$)≈0.19 index-matching to toluene and thus null-scattering of the particle solutions is expected.

In order to verify this prediction, a series of PS-coated silica nanocrystals were synthesized using ATRP. Surface functionalization of the core material was conducted as follows. Hydroxy-terminated silica colloids were dispersed in tetrahydrofuran and reacted with a mixture of a silane comprising an ATRP initiator functionality and a "dummy" silane, applied to block the silanol sites on the surface of the silica nano-particle (1-chlorodimethylsilylpropyl 2-bromoisobutyrate and chlorotrimethylsilane, respectively). Variation of the relative amounts of initiator and "dummy" initiator facilitates the effective control of the grafting density of the surface-bound polymers.

Materials.

All chemicals were purchased from Sigma-Aldrich Co., Milwaukee, Wis., USA, unless otherwise specified. Silica was obtained from Nissan Chemicals (MIBK-ST) and functionalized with the alkyl halide initiator 1-chlorodimethylsilylpropyl 2-bromoisobutyrate according to the procedure described previously. Toluene (ACS, 99.5%) was purchased from Fisher Scientific and purified by distillation and filtration through a 0.2 μm filter before being added to samples. Inhibitor from the styrene monomer was removed by passage through a column filled with basic alumina. Ethyl 2-bromoisobutyrate (EBiB), N,N,N',N'',N''-pentamethyldiethylenetriamine (PMDETA), 4,4'-dinonyl-2,2'-bipirydyne (dNbpy), copper(II) bromide, copper(II) chloride, tin(II) 2-ethylhexanoate (Sn(EH)$_2$), anisole and hydrofluoric acid (36%) were used as received from Aldrich. Copper(I) bromide was purified by washing several times with glacial acetic acid and stored (dry) under a blanket of nitrogen. Tris(2-(dimethylamino)ethyl)amine (Me$_6$TREN) was prepared as described elsewhere.

Analysis.

Molecular weight and molecular weight distribution were determined by GPC, conducted with a Waters 515 pump and Waters 2414 differential refractometer using PSS columns (Styrogel 10$^5$, 10$^3$, 10$^2$ Å) in THF as an eluent (35° C., flow rate of 1 mL/min). Linear polystyrene standards were used for calibration. Elemental analysis (bromine content) was conducted by Midwest Microlab (Indiana, U.S.).

ATRP of Styrene from 2-Bromoisobutyrate Functional Colloids with DP 10.

A Schlenk flask was charged with PMDETA ligand (21.9 μL, 0.105 mmol), initiator-modified silica particles (1.4837 g, 0.524 mmol), anisole (12.0 mL) and styrene (6.0 mL, 52.4 mmol). After three freeze-pump-thaw cycles, the flask was filled with nitrogen, then while the mixture was immersed in liquid nitrogen, 15.0 mg (0.105 mmol) of CuBr was added. The flask was sealed with a glass stopper, evacuated, and back-filled four times with nitrogen. After melting the reaction mixture and warming to the room temperature, the initial sample was taken and the sealed flask was placed in thermostated oil bath at 90° C. The reaction was stopped by opening the flask and exposing the catalyst to air after 5 h. Hybrid particles were isolated and purified by precipitation into an excess of methanol and recovered by filtration for three times. The cleavage of polymer brushes from silica particles was conducted as reported in the literature. SEC of the cleaved polystyrene was conducted to determine the molar mass of the tethered polymer ($M_n$=1,020 g/mol and $M_w/M_n$=1.08). The monomer conversion was about 2.5%, as determined from gravimetric analysis. In a similar way nanoparticles DP 140 and DP 150 were prepared.

ARGET ATRP of St from 2-Bromoisobutyrate Functional Colloids Targeting DP 760.

Styrene (St, 40.5 mL, 0.353 mmol), and anisole (38.2 mL) were added to a dry Schlenk flask. Then, silica particle initiator (0.20 g, 0.0706 mmol) and a solution of CuCl$_2$ complex (0.475 mg, 3.53 tμmol)/Me$_6$TREN (0.932 pit, 3.53 tμmol) in anisole (1.70 mL) were added. The resulting mixture was degassed by four freeze-pump-thaw cycles. After melting the mixture, a solution of Sn(EH)$_2$ (2.29 μL, 7.06 μmol) and Me$_6$TREN (1.86 μL, 7.06 μmol) in anisole (0.54 mL) was added. An initial sample was taken and the sealed flask was placed in thermostated oil bath at 90° C. The polymerization was stopped by opening the flask and exposing the catalyst to air after 23.5 h. Hybrid particles were isolated and purified by precipitation into an excess of methanol and recovered by filtration for three times. The cleavage of polymer brushes from silica particles was conducted as reported in the literature. SEC of the cleaved polystyrene was conducted to determine the molar mass of the tethered polymer ($M_n$=80,400 g/mol and $M_w/M_n$=1.32). The monomer conversion was about 5.9%, as determined from gravimetric analysis.

Static and Dynamic Light Scattering.

Measurements were performed using a Brookhaven Instruments Corporation BI-200SM goniometer and a green diode laser light source (λ=532 nm). Samples were filtered using PTFE Millipore syringe filter with 0.25 μm pore size diameter and equilibrated for 48 h before measurement. The total intensity R(q) was determined using the relation $R(q) = (\langle I(q) \rangle - \langle I(q) \rangle_{toluene}) R(90)_{toluene} (\langle I(q) \rangle_{toluene})^{-1} \sin\theta$, with $R(90)_{toluene}$=2.52 10$^{-5}$ cm$^{-1}$ denoting the Rayleigh ratio of toluene at 2θ=90 degree for vertical polarized incident light [see, Chu, B. *Laser Light Scattering*, 2nd ed.; Academic Press: San Diego, Calif., 1990.].

Transmission Electron Microscopy.

Particle imaging was conducted using a JEOL 2000 FX electron microscope operated at 200 kV. TEM samples of nanoparticles and hybrid nanoparticles were prepared by the casting the colloid solution diluted to 0.1 mg/mL in tetrahydrofuran (THF) onto a carbon-coated copper grid.

Example 1

A series of experiments were conducted wherein ATRP was applied to polymerize styrene with varying degree of polymerization DP=10, 150 and 760 for high grafting densities (σ~0.7 chains/nm$^2$) and DP=140 for a silica/polystyrene composite particle comprising a reduced grafting density (σ~0.09 chains/nm$^2$). The synthetic procedure is illustrated in FIG. 2A.

The corresponding mass ratios m(PS)/m(SiO$_2$) of the particle samples were calculated to be 0.12 (DP10), 0.22 (DP140), 2.5 (DP150) and 7.5 (DP760), respectively. The compositional characteristics of the particle samples used in our study are summarized in Table 1.

TABLE 1

Characteristics of PS@SiO$_2$ particle systems used in the present study.

| sample ID | $M_n$/(g/mol) | $M_w/M_n$ | σ/nm$^2$ | m(PS)/m(SiO$_2$) |
|---|---|---|---|---|
| DP10 | 1020 | 1.08 | 0.71 | 0.12 |
| DP150 | 15550 | 1.21 | 0.84 | 2.5 |
| DP760 | 80400 | 1.32 | 0.5 | 7.5 |
| DP140 | 14200 | 1.09 | 0.09 | 0.22 |

FIGS. 2B, 2C, 2D, and 2E depict electron micrographs of the respective particle monolayers deposited on carbon film revealing the close-packed hexagonal arrangement of the particle samples with high polymer grafting density; indicative of hard-sphere type repulsive particle interactions. Analysis of the micrographs yields the estimated radius of the grafted polymer shell for particles DP150 and DP760, $\langle r_{DP150} \rangle$≈0.6 and $\rangle r_{DP760} \rangle$=20 nm, respectively, confirming a stretched conformation of PS chains for DP150 and extended-coil conformation for DP760. For low grafting densities (DP140) repulsive entropic interactions are reduced and a disordered particle arrangement is observed.

After surface modification, all core/shell particle samples were soluble in toluene and dynamic light scattering was used to confirm the dispersion of the nanoparticles, evidenced by a single-exponential field autocorrelation function. Static light scattering of dilute solutions with equal number density of particles $N/V \approx 5 \times 10^{13}$ mL$^{-1}$ (i.e. constant c/M, with c denoting the mass concentration and M the molecular weight of the core-shell particle) were measured. The molecular weight of the particles is calculated assuming uniform particle diameter d=20 nm and grafting densities and molecular weights of the grafted PS as provided in Table 1. With respect to the conclusions drawn from the experimental data this value provides an appropriate estimate since deviations; e.g., arising from the finite disparity of particle sizes, will affect all samples similarly. The data was used in order to infer the implications of particle architecture on the scattering cross-section.

Figure 3:
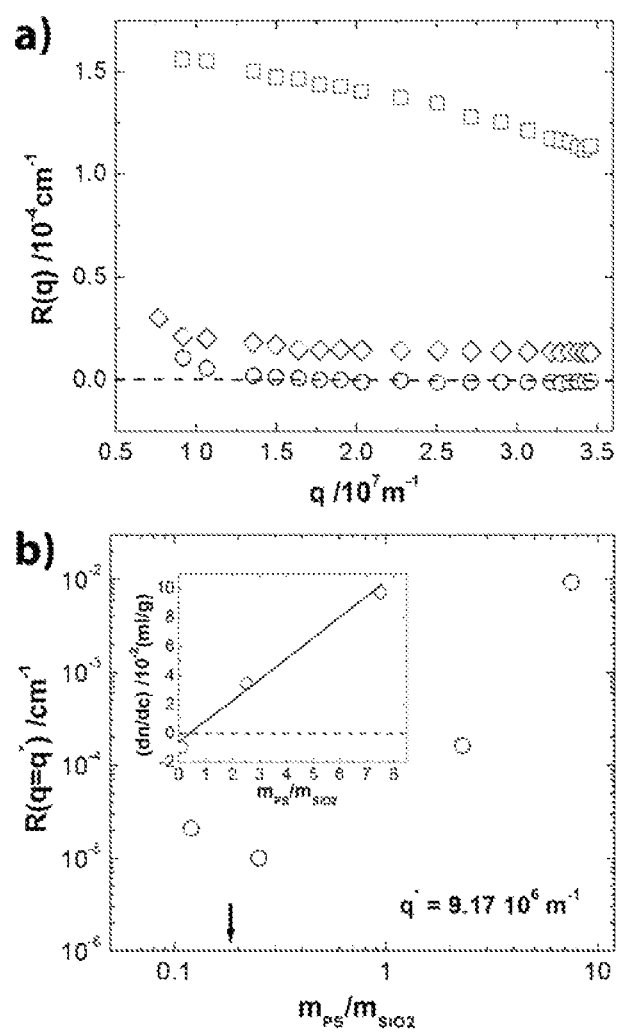
FIGS. 3A and 3B illustrate plots of total scattered intensity R(q) for core-shell particles according to specific embodiments herein.
Figure 4:
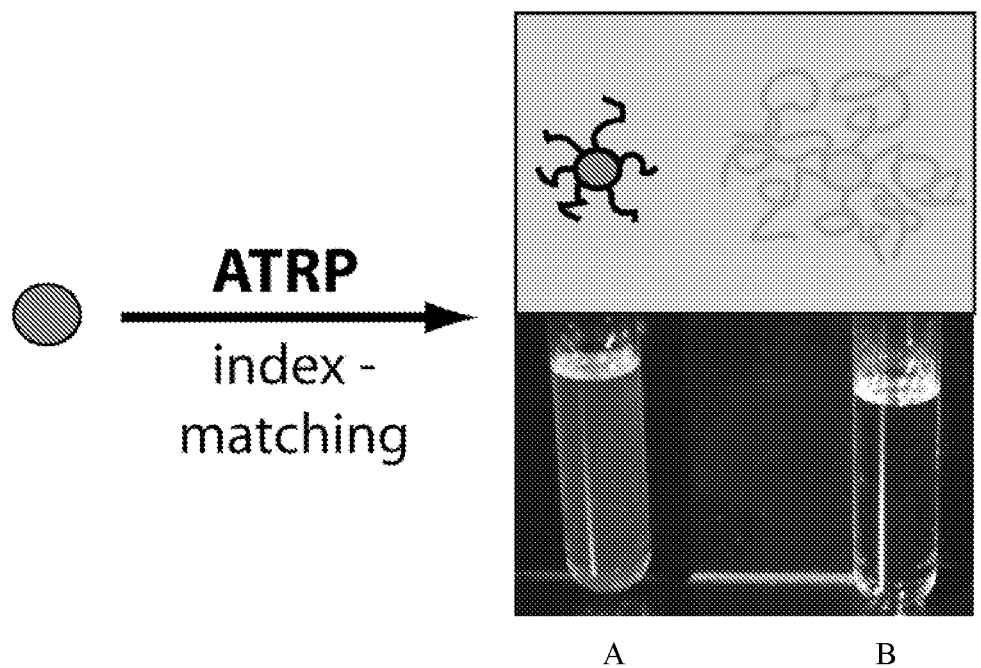
FIG. 4 is an image of a silica nano-particle dispersion having bare core material particles (A) and core-shell particles (B) according to the present disclosure.

FIG. 3A depicts the angular dependence of the absolute scattered intensities (given in terms of the Rayleigh ratio R(q), with $q=4\pi n_{toluene} \lambda^{-1} \sin\theta$ denoting the modulus of the scattering vector, $\lambda$ the wavelength and $2\theta$ the scattering angle) of samples DP10 ($\diamond$, c=0.3 mg/mL), DP140 ($\circ$, c=0.3 mg/mL) and DP150 ($\square$, c=0.8 mg/mL). Whereas the scattered intensity of sample DP150 (and similarly DP760, not shown in FIG. 3A) exhibits pronounced q-dependence, the scattering curves of DP10 and DP140 are found to be approximately angle-independent with the scattering intensity of DP140 approximately equal to the solvent scattering.

In general, the angular dependence of the scattered light for a dilute solution of particles with small phase shift (i.e. $2\pi d|(n_{eff}/n_m)-1|/\lambda \ll 1$) is given by the Rayleigh-Gans-Debye approximation as I(q)=I(0)P(q), with P(q) denoting the particle form factor to account for interference contributions. I(0) is the forward scattered intensity that provides a measure for the overall scattering strength of the particles and can be determined by extrapolation of I(q) to q=0, Since established form factor relations are limited and are only applicable to core-shell particles close to the index-matching condition I(0) will be approximated by experimental values at small scattering angles.

FIG. 3B depicts the scattered intensity R(q) at q*=9.16×10$^6$ m$^{-1}$ as function of the particle composition m(PS)/m(SiO$_2$) (corresponding to a scattering angle of 30 degree) for all particle samples, revealing a decrease in the scattering strength for sample DP140 by two orders of magnitude as compared to DP150, four orders of magnitude as compared to DP760, and a decrease by 300% as compared to DP10. Scattering characteristics of PS@SiO$_2$ particle systems at equal particle number density c/M. The reduction of forward scattering of sample DP140 confirms the approximate index-matching condition. The arrow indicates theoretical null-scattering composition m(PS)/m(SiO$_2$)≈0.19. The inset shows the refractive index increment for particle samples DP10, DP150 and DP760 confirming that index-matching (i.e. dn/dc=0) is expected for particle compositions m(PS)/m(SiO$_2$)≈0.2, close to the theoretical value.

Note that the mass composition of sample DP140 m(PS)/m(SiO$_2$)=0.22 is close to the theoretical index-matching condition m(PS)/m(SiO$_2$)≈0.19. This result is supported by measurements of the refractive index increment (dn/dc) of the respective particles in solution that confirm index-matching conditions (i.e. (dn/dc)=0) for a composition close to m(PS)/m(SiO$_2$)=0.2.

This exemplary non-limiting study demonstrates that the scattering cross-section of nano-particle inclusions within an embedding medium can be dramatically reduced by appropriate surface modification, such as to substantially match the effective refractive index of the resulting core-shell particle to the refractive index of the embedding medium (quasi-transparency condition) and that classical effective medium theory provides a viable means to predict null-scattering conditions. This approach pertains to a wide variety of embedding media (such as polymers, polymer gels or glasses), as long as the dispersion state of the particle inclusions is maintained.

This approach offers new opportunities for the design of multi-functional particle coatings in which the polymer-functionalization serves a dual purpose: a) to facilitate compatibilization of the nano-particle with the embedding medium, and b) to suppress scattering contributions of the core by index-matching the core-shell particle with the embedding medium. For example, Table 2 provides a selection of common particle filler materials with appropriate composition of surface-grafted polymer to achieve index-matching and compatibilization (the selected polymer pairs are chosen due to their respective negative Flory-Huggins interaction parameter [see, Y. S. Lipatov, A. E. Nesterov *Thermodynamics of Polymer Blends*, Polymer Thermodynamics Library, Vol. 1, Technomic Publishing Co., Inc., Lancaster, Pa., 1997]) for a variety of matrix polymers.

TABLE 2

Composition and architecture of selected polymer-coated particle systems for compatibilization and index-matching with the respective matrix polymer (calculated using Equation 2 and assuming an inorganic particle diameter of d = 20 nm).

| core (n) | shell (n) | matrix (n) | r(shell)/nm |
|---|---|---|---|
| SiO$_2$ (1.4631) | PS-co-A 75/25 (1.57) | PMMA (1.4893) | 1 |
| SiO$_2$ (1.4631) | PAA (1.527) | PVA (1.5214) | 12 |
| SiO$_2$ (1.4631) | PCS (1.6098) | PS (1.5894) | 9.3 |
| ZnO (1.79) | PMMA (1.4893) | PS-co-A 75/25 (1.57) | 6 |
| ZnO (1.79) | PVA (1.5214) | PAA (1.527) | 25 |
| ZnO (1.79) | PS (1.5894) | PPO (1.643) | 5.4 |
| Al$_2$O$_3$ (1.765) | PMMA (1.4893) | PS-co-A 75/25 (1.57) | 5 |
| Al$_2$O$_3$ (1.765) | PVA (1.5214) | PAA (1.527) | 24 |
| Al$_2$O$_3$ (1.765) | PS (1.5894) | PPO (1.643) | 5 |
| TiO$_2$ (2.95) | PMMA (1.4893) | PS-co-A 75/25 (1.57) | 13 |
| TiO$_2$ (2.95) | PVA (1.5214) | PAA (1.527) | 48 |
| TiO$_2$ (2.95) | PS (1.5894) | PPO (1.643) | 17 | n denotes the refractive index; PS-co-A: polystyrene-co-acrylonitrile, PMMA: polymethyl methacrylate PAA: polyacrylic acid, PVA: polyvinylalcohole, PPO: polyphenylene oxide, PCS: polychlorostyrene, PS: polystyrene.

While synthetic methodologies to achieve appropriate architectures are a challenge, the further development of polymerization techniques such as CRP that facilitate the control of both, grafting density and molecular weight of the surface-bound polymer allows one to tailor the composition of quasi-transparent particle additives for a wide array of filler and polymer compositions.

A further advantage of all CRP processes is that in a "grafting from" functionalization of a particle surface, the growing chain end retains the active functionality and tethered block copolymers can be prepared. One can envision this as a dual shell nano-particle where the composition of the outer shell can be selected to dissolve in the matrix material whereas the composition of the incompatible inner shell can be selected to provide the required modification of the refractive index of the composite structure to match the embedding matrix.

A further embodiment of the process is that the grafting density and/or composition of the tethered (co)polymer chains can be adjusted so that the tethered chains can "dissolve" in the embedding matrix and provide a stable macro-composite structure comprising dispersed core/shell nano-particles in the matrix material while still providing the desired modification of the refractive index of the core/shell nano-composite. An example would be the preparation of a gradient copolymer that can only be prepared by a CRP. The tapered nature of the copolymer could be designed so that the outer segments of the tethered copolymer are more soluble in the matrix than the closer tethered units.

A further embodiment of the process is that the refractive index of the core of the nanoparticles can be modified by filling any voids within the first formed core material with monomers that will comprise the core to provide a solid core material with a modified refractive index.

The invention claimed is:

1. A composite material comprising:
an embedding medium; and
a core-shell composite particle suspended in the embedding medium,
wherein the composite material displays at least 90% transmittance of incident electromagnetic radiation, and
wherein the core-shell composite particle comprises a core material having a first refractive index and a shell material having a second refractive index different from the first refractive index,
wherein the core-shell composite particle has an effective refractive index within five percent of a refractive index of the targeted embedding medium, and the effective refractive index of the particle will have a value between the first refractive index and the second refractive index,
wherein upon suspension of the core-shell composite particle in the embedding medium to form a matrix, the matrix displays a reduced scattering cross-section of incident electromagnetic radiation compared to a matrix wherein the effective refractive index of the core-shell composite particle is greater than five percent of the refractive index of the embedding medium.

2. The composite material of claim 1, wherein the core material is selected from the group consisting of an inorganic material and an organic material.

3. The composite material of claim 1, wherein the shell material is selected from the group consisting of an inorganic material and an organic material.

4. The composite material of claim 1, wherein the shell material is an organic (co)polymeric material formed by a controlled (co)polymerization process.

5. The composite material of claim 4, wherein the organic (co)polymeric material is formed by a controlled radical (co)polymerization process.

6. The composite material of claim 4, wherein the shell material is grafted from at least a portion of a surface of the core material by a controlled radical (co)polymerization process, wherein the core material originally comprises surface terminal functionality comprising radically transferable atoms or groups.

7. The composite material of claim 4, wherein the controlled ((co)polymerization process is a controlled radical (co)polymerization process selected from the groups consisting of atom transfer radical polymerization(ATRP), reverse ATRP, simultaneous reverse and normal initiation ATRP (SR&NI ATRP), initiator for continuous activator regeneration ATRP (ICAR ATRP), and activators regenerated by electron transfer ATRP (ARGET ATRP).

8. The composite material of claim 1, wherein the first refractive index is greater than the second refractive index.

9. The composite material of claim 1, wherein the first refractive index is less than the second refractive index.

10. The composite material of claim 1, wherein the first refractive index has an equal or opposite sign of the refractive index dispersion compared to the sign of the second refractive index.

11. The composite material of claim 1, wherein the difference between the effective refractive index and the refractive index of the embedding medium is ±0.05.

12. The composite material of claim 1, wherein the shell material has a graft density sufficiently high to prevent solvent/matrix interpenetration of the shell material.

13. The composite material of claim 1, wherein the shell material has a graft density sufficiently low to allow solvent/matrix interpenetration of the shell material.

14. The composite material of claim 1, wherein the core material and the shell material comprise incompatible segments.

15. The composite material of claim 1, wherein at least one of the core material and the shell material comprise crosslinked (co)polymer segments.

16. The composite material of claim 1, wherein the matrix is transparent.

17. The composite material of claim 1, wherein the matrix displays at least 70% transmittance of incident electromagnetic radiation.

18. The composite material of claim 1, the core-shell composite particle having a particle size less than a wavelength of incident electromagnetic radiation.

19. The composite material of claim 1, wherein the core material comprises an inorganic material selected from the group consisting of a metal, a metal oxide, and a dielectric material, and the core material has a core size ranging from 2 nm to 500 nm.

20. The composite material of claim 1, wherein the core material comprises an inorganic material selected from the group consisting of a metal, a metal oxide, and a dielectric material, and the core material has a core size smaller than the wavelength of incident electromagnetic radiation for which scattering is to be reduced.

21. The composite material of claim 1, wherein the core material comprises an organic material having a glass transition temperature less than room temperature.

22. A process for forming a composite material comprising:
providing a core material having a surface comprising surface functionality comprising radically transferable atoms or groups; and
grafting a (co)polymer shell material from at least a portion of the surface of the core material by a controlled radical (co)polymerization process,
wherein the core-shell composite particle has an effective refractive index determined by a refractive index of the core material and a refractive index of the (co)polymer shell material that is within five percent of a refractive index of a targeted embedding medium, wherein the value of the effective refractive index is between the refractive index of the core material and the refractive index of the (co)polymer shell material, and wherein the refractive index of the core material is different from the refractive index of the (co)polymer shell material, wherein upon suspension of the core-shell composite particle in the embedding medium to form a matrix, the matrix displays a reduced scattering cross-section of incident electromagnetic radiation compared to a matrix wherein the effective refractive index of the core-shell composite particle is greater than five percent of the refractive index of the embedding medium, wherein the composite material displays at least 90% transmittance of incident electromagnetic radiation.

23. The process of claim 22, wherein the core material and the shell material comprise different constituents having equal or opposite signs of the refractive index dispersion.

24. The process of claim 22, wherein providing a core material having a surface comprising surface functionality comprises functionalizing at least a portion of a surface of the core material with a reactive mixture of reactants having an initiator functionality and reactants having no initiator functionality, wherein the initiator functionality comprises a radically transferable atom or group and wherein a grafting density of the radically transferable atoms or groups on the at least a portion of the surface of the core material is controlled by the ratio of the reactants having the initiator functionality and the reactants having no initiator functionality.

* * * * *